United States Patent [19]
King, Jr.

[11] 3,835,615
[45] Sept. 17, 1974

[54] FASTENER JOINT CONSTRUCTION

[76] Inventor: John O. King, Jr., 3990 N. Ivy Rd., Atlanta, Ga. 30342

[22] Filed: July 3, 1972

[21] Appl. No.: 268,478

Related U.S. Application Data

[63] Continuation-in-part of Ser. No. 33,281, April 30, 1970, abandoned, which is a continuation-in-part of Ser. No. 711,368, March 7, 1968, abandoned.

[52] U.S. Cl............... 52/758 D, 29/526, 285/4, 85/77, 151/41.74
[51] Int. Cl............................................. F16b 5/00
[58] Field of Search.......... 287/189.36 D, 189.36 F, 287/189.36 L, 20.92 E, 20.92 C; 285/4; 85/70, 77, 1 R; 151/41.74; 29/526

[56] References Cited
UNITED STATES PATENTS

| | | | |
|---|---|---|---|
| 771,236 | 10/1904 | Farley | 29/526 UX |
| 986,905 | 3/1971 | Carlson | 285/4 |
| 1,584,711 | 5/1926 | Astrom | 29/526 X |
| 1,994,210 | 3/1935 | Chobert | 85/77 X |
| 2,884,099 | 4/1959 | Nenzell | 287/189.36 D |
| 3,029,912 | 4/1962 | Barker | 29/526 UX |
| 3,257,889 | 6/1966 | Fischer | 29/526 X |
| 3,271,058 | 9/1966 | Anderson | 151/41.74 X |
| 3,339,003 | 8/1967 | Cessna | 29/526 X |
| 3,405,592 | 10/1968 | Blodee | 287/20.92 E X |

*Primary Examiner*—Jordan Franklin
*Assistant Examiner*—Wayne L. Shedd
*Attorney, Agent, or Firm*—B. J. Powell

[57] ABSTRACT

A joint assembly including work pieces with aligned holes of a prescribed diameter therethrough, a fastener in the holes and having a shank portion a prescribed amount less in diameter than the holes, and a metal sleeve member positioned between the shank portion of the fastener and the work pieces within the holes and in bearing contact with both the shank portion and the work pieces. The sleeve member includes a tubular side wall encircling the shank and substantially filling the space between the shank and the work pieces. The thickness of the tubular wall is nominally 0.008 or 0.016 inch. The metal sleeve member should preferably be made of a material similar in strength to that of the work pieces. For the high strength requirements of the aerospace industry the metal sleeve member should have a Brinell Hardness Number of at least 60 and/or a yield strength in excess of 20,000 p.s.i. The sleeve member may also be provided with a outwardly extending head flange at one end thereof and the tubular wall may be circumferentially grooved at longitudinally spaced intervals to allow the length of the wall to be adjusted by removal of excess material and to provide sealant reservoirs along the length of the tubular wall adjacent the work pieces about the aligned holes. The distal end of the tubular side wall may be tapered inwardly to provide a self-centering capability as the sleeve member is inserted into the holes, especially in interference.

24 Claims, 16 Drawing Figures

FASTENER JOINT CONSTRUCTION

CROSS-REFERENCE TO RELATED APPLICATIONS

This application is a continuation-in-part of my copending application Ser. No. 33,281, filed Apr. 30, 1970 which application is a continuation-in-part of my application Ser. No. 711,368, filed Mar. 7, 1968, both now abandoned.

BACKGROUND OF THE INVENTION

1. Field of the Invention

This invention relates generally to apparatus for enlarging the effective diameter of fasteners and/or for preventing corrosive chemical reactions between work pieces and fasteners attaching the work pieces together, and more particularly to a preformed sleeve which may be placed around the shank of the fastener in bearing contact therewith. The sleeve has an outside diameter to increase the effective diameter of the fastener and to be in bearing contact with the work pieces when the fasteners are in position through aligned holes in the work pieces. The invention is primarily aimed at, though not necessarily limited to, aerospace and marine structures. In such structures shear loading of fasteners in especially prevalent and precision fasteners in close tolerance holes are always used. This invention is meant to solve problems relating to fastener installation especially in these structures.

2. Discussion of the Prior Art

Generally high strength fasteners for attaching together work pieces having aligned holes therethrough in highly loaded structures come in standard graduated sizes. It has been found in practice, however, that when one of these standard fasteners has been inadvertently and improperly installed in work pieces of a critical, highl loaded structure, it is necessary to remove these fasteners therefrom and replace them. Under present conditions, when the fasteners are to be replaced, the aligned holes through the work pieces must be redrilled to the next larger standard fastener diameter because of the damage resulting from improperly installed fasteners or from corrosion. This requires the use of the next larger standard diameter fastener which is appreciably larger in diameter than the fastener previously installed therein usually larger by 1/32 or 1/16 inch. A special oversize type fastener, which falls between two standard size fasteners has been used to fasten the work pieces together. Such non-standard oversize fasteners are normally made in very small quanities and to special order. The cost of producing, stocking, and distributing them in the work areas where these fasteners are used becomes prohibitive when large numbers of fasteners are being utilized as in the aerospace industry. A means of easily making standard diameter fasteners oversize on the job is required. This means requiring that the oversizing elements must be made of rigid, relatively hard and strong material which will transmit bearing loads from the fastener to the work pieces.

It iw also necessary that the diameter of the oversizing element be close tolerance within a range of 0.002 inch both in outside and inside diametral tolerances. It is also essential tbat the fastener with the surrounding enlarging element have an outside diameter such that the enlarged holes which it fits into can be made with standard, readily available drills and reamers. Another feature which is essential is that the oversizing element not require a hole of an appreciably larger size which will significantly reduce the edge distance relationship of the fastener with the sheet edge. Conventional edge distance, as measured from edge of sheet to center of hole is 2 times the fastener or hole diameter. In modification and repair this may be 1½ times. Experience shows that, with oversizing of 1/64 inch on basic standard fastener diameter, a repair can be effected without jeopardizing structural integrity. Another consideration is that the material between holes is not significantly reduced. With only a 1/64 inch diametral enlargement, the net reduction in load carrying material between holes is only 1/64 inch or about 0.4 mm. These conwiderations are all essential to successful fastening of high loaded structures.

Moreover, it has been found that when the material of the fastener and the work pieces are chemically dissimilar, there generally is a tendency for the fastener to chemically react with the work pieces and cause corrosion to take place therebetween. This becomes especially acute in highly corrisive atmospheres, such as naval and tropical uses. When this corrosion takes place between the fasteners and the work pieces, it is necessary to remove the fastener, chemically clean the holes through the work pieces or redrill the holes oversize to remove the corroded metal, and subsequently replace the fastener with the same size fastener or with an oversize fastener. This, too, becomes prohibitively costly when it is required that they be replaced on a large scale.

SUMMARY OF THE INVENTION

These and other problems associated with the prior art fasteners and work piece joints are overcome by the invention disclosed herein in that a metal sleeve is provided around the shank of the fastener that extends through the work pieces. The sleeve is in bearing contact both with the fastener and the work pieces so that the load carrying capabilities of the joint, especially in shear, are not reduced. The sleeve may be provided at one end with a flared portion which fits adjacent to and beneath the head of the installed fastener and may be reformable so that the sleeve can be used both with the conventional exposed head fasteners or with the conventional countersunk head fasteners. The sleeve may be circumferentially scored so that a sealant reservoir is provided when the joint is driven "wet" and so that the length of the sleeve may be appropriately selected and the excess removed for each particular application. The wall thickness of the sleeve is such that the effective diameter of the fastener is enlarged nominally 1/64 or 1/32 inch. The material of the sleeve should normally be similar in strength to that of the work pieces of the joint and, for highly stressed joints such as those normally found in the aerospace industry, such material should be a metal with a Brinell Hardness Number of at least 60 and/or a yield strength in excess of 20,000 p.s.i.

By making the sleeve out of a material that is both strong and chemically inactive with the work pieces, the corrosion that normally attacks the basic structure can then take place between the fastener and the sleeve around the fastener. This provides a condition so that the sleeve member and fastener are attacked as sacrificial anodes. The fastener and sleeve member can be easily removed from the work pieces and replaced without having to further enlarge the holes in the critical basic structure.

Circumferential grooves may be placed in the sleeves at 1/64 inch increments or other increments corresponding to the fastener grip increments in amount and in location. These grooves are about half as deep as the wall thickness of the sleeves or about 0.0035 inch in depth. These grooves are of a V-type with a sharp bottom. The grooves serve several purposes. One purpose is to hold sealant and/or bonding agent which will bond the sleeve to the wall of the hole and act as a seal to prevent the flow of liquids or gases through the joint by way of a space between the sleeve and the work pieces. Another purpose is to permit stocking long sleeves and just prior to installation, break off or cut off the excess sleeve lengths. The break-off may be made by use of a special tool or by cutting off with a knife.

These and other features and advantages of the invention will be more clearly understood upon consideration of the following specification and accompanying drawings wherein like characters of reference designate corresponding parts throughout the several views and in which:

These figures and the following detailed discription disclose specific embodiments of the invention; however, the inventive concept is not limited thereto since it may be embodied in other forms.

DESCRIPTION OF THE ILLUSTRATIVE EMBODIMENTS

All of different embodiments of the joint assembly disclosed herein utilize a tubular sleeve member which serves to enlarge the effective diameter of fasteners to make a composite oversize fastener joint. In addition, those embodiments of the fastener shown in FIGS. 1–4 and 6–12 serve, when the material thereof is suitably chosen, to prevent corrosive chemical reactions between the fastener and the work pieces.

Figure 1:
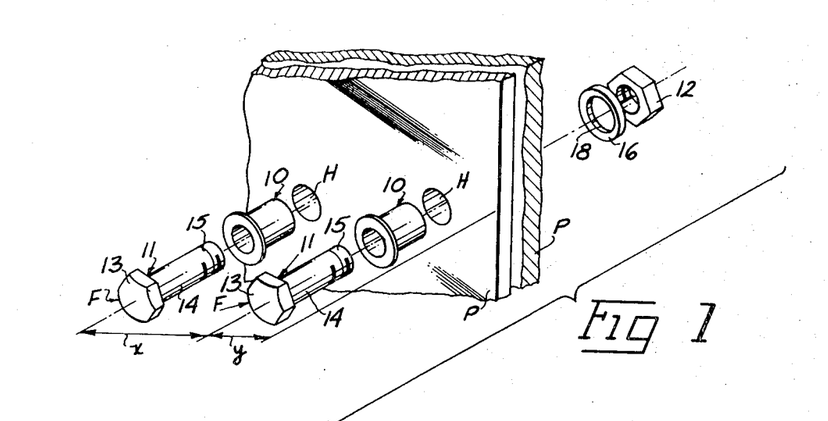
FIG. 1 is an exploded perspective view of the invention with its fastener.

Referring specifically to FIG. 1, the adapter 10 of the invention is to be utilized with a conventional standard diameter fastener F, here shown as a bolt 11 with head 13, shank 14 and threaded end 15; and nut 12 to fasten work pieces P together. The work pieces P have aligned holes H therethrough with a predetermined diameter. The holes H are slightly oversize from these normally made for the shank 14 of fastener F, usually one-half of a standard size difference. For smaller diameter fasteners, the standard size difference is in 1/32 inch increments and for larger diameter fasteners, the standard size difference is in 1/16 inch increments. While the fastener F shown in FIG. 1 is of the exposed head type with a constant diameter shank, it is to be understood that other type fasteners such as those shown in FIGS. 10 and 11 may be used.

Figure 2:
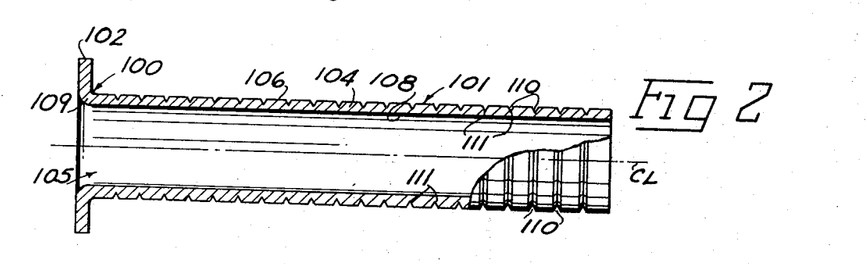
FIG. 2 is a longitudinal cross-sectional view of one embodiment of the invention for use with an exposed head fastener.
Figure 9:
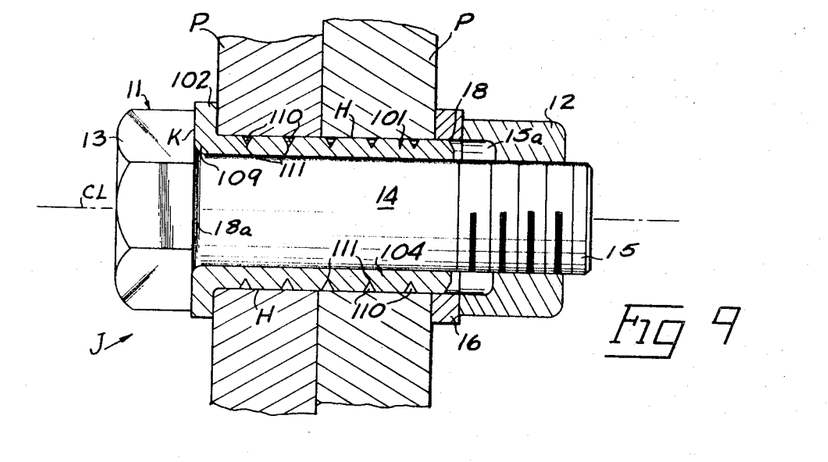
FIG. 9 is a longitudinal cross-sectional view of that embodiment of the invention shown in FIG. 2 as installed.
Figure 10:
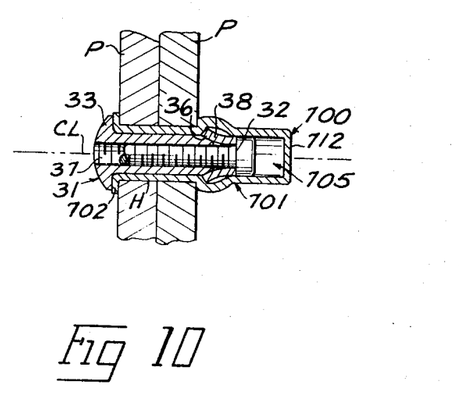
FIG. 10 is a longitudinal cross-sectional view of that embodiment of the invention shown in FIG. 8 as installed in a blind application.

In highly loaded structures such as those of the aerospace and marine industries, the spacing $x$ between adjacent holes H through the work pieces and the free edge distance Y is so critical that the use of the next standard larger size fastener F may often exceed the safety margin allowed in the basic design. On the other hand, the smaller diameter of the adapter 10 allow them to be used to enlarge the fastener without exceeding this safety margin. Referring more specifically to FIG. 2 a first embodiment of the adapter 10 is shown and designated generally by the numeral 100. This adapter 100 is designed specifically for use with an exposed head, constant diameter shank fastener. The adapter 100 includes a shank sleeve 101 and an annular head flange 102. The shank sleeve 101 is designed to precisely fit in the holes H between the work pieces P and shank of the fastener as seen in FIG. 9.

The sleeve 101 includes a tubular side wall 104 defining a fastener receiving central passage 105 therethrough into which the shank 14 is received. The outside surface 106 of side wall 104 is of constant diameter and so is the inside surface 108 thereof with the wall 104 having a thickness of one-half the difference in diameter of shank 14 of the fastener F and the holes H in the work pieces P. As stated hereinabove, this thickness is nominally 0.008 inch. In actual practice the thickness may vary between 0.006 inch and 0.009 inch.

The annular flange 102 is intergral with one end of sleeve 101 through bend 109 and extends outwardly around sleeve 101 perpendicular to the centerline CL of passage 105 and sleeve 101. The width of flange 102 is approximately that of the underside bearing surface K of head 13 and the thickness thereof is approximately that of side wall 104. The radius of bend 109 is such that it will fit within the fillet 18a between the head 13 and shank 14 as seen in FIG. 9.

The original length of sleeve 101 is usually formed greater than the grip length of the shank 14 of bolt 11. The sleeve 101 may be adjusted to a length corresponding to the grip length of shank 14 of bolt 11 so that the grip length of adapter 100 is very nearly the same as bolt 11 for use as seen in FIG. 9. For assisting in adjusting the length of sleeve 101, a plurality of circumferentially extending, axially spaced, V-shaped grooves 110 are provided around the side wall 104. The grooves 110 are axially spaced along the wall 104 in increments and location corresponding to the standard grip increments and location of the fastener F. Each sharp bottom 111 of the grooves 110 lies in a plane perpendicular to centerline CL to insure a close correspondence between fastener grip length and sleeve grip length when the sleeve 101 is severed along one of these xrooves. The sharpness of the bottoms 111 of grooves 110 is also critical. Unless the bottom 111 come to substantially a line point, attempts to sever the sleeve 101 by applying radial and longitudinal opposed separation forces across the groove 110 will result in the sleeve 101 splitting or breaking so as not to produce a smooth working edge along the break at the groove. This is especially critical for higher strength materials such as stainless steel and for larger diameter sleeves such as ⅜ inch. The depth of the grooves 110 is sufficient to insure easy severing of the sleeve 101 yet enough material remains in wall 104 between the bottom 111 and inside surface 108 to prevent further separation of sleeve 101 after installation. The depth of grooves 110 is usually one-half the thickness of wall 104 or 0.0035 inch for an adapter having a wall thickness of 1/128 inch for sleeve 101.

By stocking adapters 100 having sleeve lengths greater than the individual fastener grip lengths, fewer different adapters need by stocked since the excess sleeve 101 may be broken or cut off just prior to installation to adjust the sleeve grip length to that of the fastener to be used as seen in FIG. 9. This adjustment may be made using a special tool or knife. The sleeve 101 may be left ungrooved and later cut to length by a special tool to adjust the grip length thereof.

The grooves 110 also serve as reservoirs to trap and hold a coating of sealant or bonding agent when installed. This will prevent the flow of liquids or gases through the fastener-adapter joint as well as bond the adapter 100 to the work pieces P. Because the grooves 110 are located in the wall 104 of sleeve 101, the original strength of the fastener F and work pieces P are maintained. If the shank 14 of fastener F were grooved to hold the sealant or bonding agent, then the tensile strength of the fastener F would be reduced sufficiently to cause the fastener to fail as the nut 12 is tightened to form the joint. Moreover, grooving the inside of the holes H through the work pieces P would not only reduce the strength of the work pieces, but would also be prohibitively expensive from a production standpoint. The sleeve member 101, on the other hand, does not fail even though it is grooved because the member 101 does not carry any tension or compression load, but only shear loads. Additional grooves 110 may be provided on the inside of side wall 104 to provide internal reservoirs to entrap sealant or a bonding agent therein.

Figure 13:
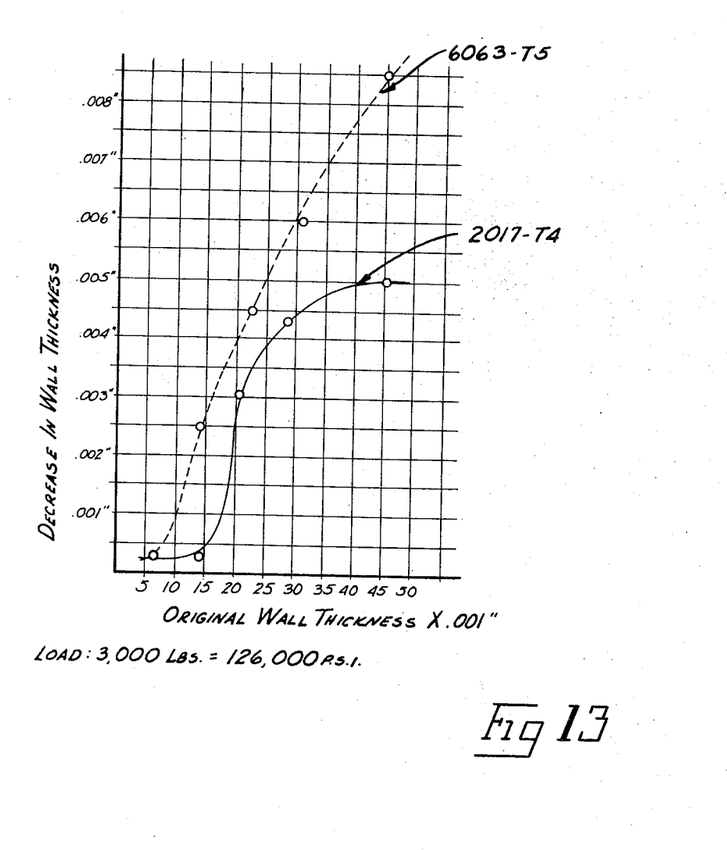
FIG. 13 is a graph showing the effect of material thickness on material flow; and, FIGS. 14–16 illustrate another embodiment of the invention.

The material of the adapter 100 is similar in strength to the work peices P so that failure of the adapter under load will not occur. In highly stressed joints such as the aircraft induwtry, the work pieces are normally of metals with a Brinell Hardness Number of at least 60 and/or a yield strength in excess of 20,000 p.s.i. In such joints, the thickness of wall 104 becomes critical since the amount the wall 104 thins out under shear loading of the joint J in which it is used is not a linear relationship with respect to wall thickness. In tests conducted by the inventor, the metals set forth in Table I at the end of this specification were used for a joint such as that used in the aerospace industry and at a loads exceeding the design loads recommended for such joints. The effect of wall thickness is illustrated in the graph of FIG. 13 which shows the graph using 6063-T5 aluminum alloy in a dashed line and shows the graph using 2017-T4 aluminum alloy in solid lines. The 2017-T4 alloy is appreciably stronger and harder than the 5052 aluminum alloy used for the material of the sleeve 101 and the 6063-T5 alloy is appreciably weaker and no harder than the 5052 alloy. The work pieces P of such a joint J are normally 7075-T6 aluminum alloy and have a maximum design load less than the load at which the tests were conducted. As seen from FIG. 13, a nominal wall thickness of 1/128 inch or 0.008 inch produces insignificant flow (less than 0.001 inch reduction in wall thickness) in the side wall 104 of sleeve 101 when the material of the sleeve 101 has a Brinell Hardness Number of at least 60 and/or a yield strength of 20,000 p.s.i. The thickness of side wall 104 where the flow changes from insignificatnt (less than 0.001 inch) to significant (greater than 0.001 inch) shall be termed the threshold thickness of the material. It will also be noted that a nominal wall thickness of 1/64 inch or 0.016 inch produces insignificant flow in the side wall 104 of sleeve 101 when the material of sleeve 101 has a Brinell Hardness Number of at least 100 and/or a yield strength in excess of 35,000 p.s.i. Other metals that have been used with success for the adapter 100 have been various stainless steels. It will be noted that the stainless steels are considerably stronger than the aluminum alloys set forth above. A list of representative stainless steels that have been used is set forth in Table II at the end of this specification. The higher strengths of the stainless steels are highly beneficial when the adapter 100 is driven into an interference fit.

Making the adapter 100 out of a material which is galvanically suitable for use with the work pieces P will also prevent corrosive chemical reactions with the work pieces P since any reaction due to chemical incompatability will take place between the adapter and fastener. This allows the adapter 100 to be periodically removed and replaced without extensive repair work to the work pieces as was previously required.

The adapter 100 is installed as shown in FIG. 9 by first severing sleeve 101 so that its grip length corresponds to the total length of the holes H in the work pieces and the grip length of the shank 14 of bolt 11. The adapter is then inserted over the fastener and the assembly inserted through the aligned holes in the work pieces. The oversize holes H may be made with standard, readily available drills and seamers since the inside and outside diametral tolerances of the sleeve 101 are maintained within the range of 0.002 inch. Before nut 12 is threaded onto bolt 11, a washer 16 having a passage 18 therethrough to receive the protruding end of sleeve 101 may be placed around the fastener-adapter assembly on that side of the work pieces P oppoosite head 13 of bolt 11. Then the nut 12 is installed and tightened to finalize the installation.

The nut 12 may have an annular recess 15a on the back side thereof large enough to receive the protruding end of sleeve 101 and prevent interference between the nut 12 and sleeve 101 as the nut is tightend. The washer 16 is made of a material which is galvanically suitable for use with work pieces P to insure that corrosive chemical reactions can only take place between the washer 16 and nut 12. While an exposed head, constant diameter shanked bolt has been illustrated with the adapter 100, it is to be understood that any exposed head, constant diameter shanked fastener may be used therewith.

Also, since both sides of flange 102 and sleeve 101 are supported upon installation, substantially no deformation thereof takes place, especially in the sleeve 101 which must take the shear load on the structure. The joint formed by the fastener-adapter assembly is as great in strength as a similar joint using only a fastener.

Figure 3:
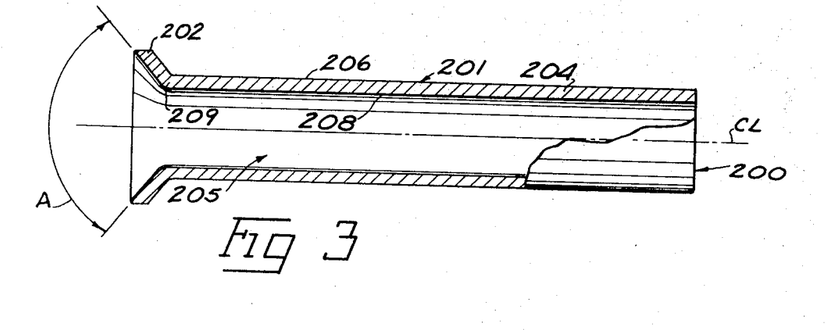
FIG. 3 is a longitudinal cross-sectional view of another embodiment of the invention for use with a countersunk head fastener.

A second embodiment of the adapter 10 is shown in FIG. 3 and designated generally 200. The adapter 200 is designed for use with a standard countersunk head, constant diameter shanked fastener similarly to than described for adapter 100 with an exposed head. The adapter 200 includes a shank sleeve 201 and head flange 202. Sleeve 201 is similar to sleeve 101 with a side wall 204 defining passage 205 about centerline CL along with an inside surface 208 and outside surface 206. Sleeve 201 is dimensioned similarly to sleeve 101 wor a precision fit between the fastener and work pieces. While sleeve 201 is shown ungrooved, it may also be grooved as sleeve 101 serve as sealant reserviors and to assist in length adjustment for the appropriate grip length in use.

The annular flange 202 is intergral with one end of sleeve 201 through bend 209 and concentric about passage 205. The flange 202 defines an included angle A equal to that of the fastener to be used therewith. For standard countersunk fasteners in the aircraft industry this included angle is 100°. The width of flange 202 is sufficient for its exposed edge to be approximately flush with the outside surface of the work piece when installed, and the thicknews thereof is approximately that of wall 204 of sleeve 201.

The adapter 200 is installed in a manner similarly to that already described for adapter 100. By making the adapter 200 out of a material chemically compatable with the work pieces, corrosion of the work pieces can be prevented.

Figure 4:
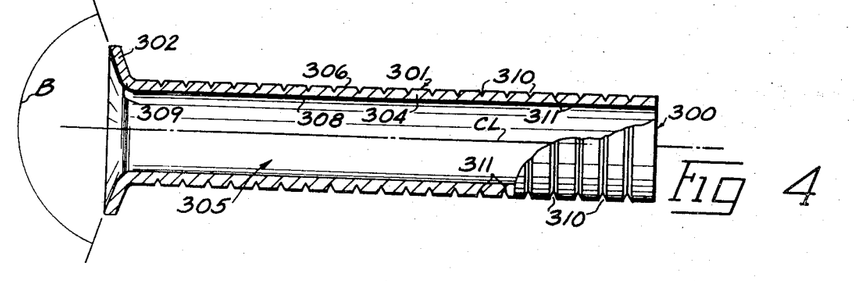
FIG. 4 is a longitudinal cross-sectional view of another embodiment of the invention that can be universally used with both exposed and countersunk head fasteners.

FIG. 4 illustrates a third embodiment of the adapter 10 and is referenced generally by the numeral 300. This adapter includes a shank sleeve 301 similar to sleeves 101 and 201 and a modified head flange 302 which allows adapter 300 to be used both with exposed head and countersunk head, constant diameter shanked fasteners.

Sleeve 301 includes tubular side wall 304 defining passage 305 therethrough with wall 304 defining inside and outside surfaces 308 and 306 respectively concentric about centerline CL thereof. The wall 304 is grooved at 310 similar to grooves 110. Each groove 310 is V-shaped with a sharp bottom 311 lying in a plane perpendicular to centerline CL and arranged to adjust the length of the sleeve 301 to the grip length of the fastener to be used therewith as described above for adapter 100. The thickness of wall 304 is the same as that for walls 104 and 204.

Flange 302 is integral with one end of sleeve 301 through bend 309 and concentric about centerline CL. The included angle B of flange 302 is one-half the sum of the included angles of a standard exposed head and countersunk head fastener. For the aircraft industry, this angle is 140°. When the adapter 300 is positioned around an exposed head fastener such as bolt 11 and inserted in the hole H, the flange 302 will be moved by deforming bend 309 to a position corresponding to bend 109 as nut 12 is tightened. Bend 309 wwll be deformed as the underside of head 13 engages the outer peripheral edge of flange 302 and the work piece P around hole H engages that side of bend 309 adjacent same. Similar deformation of bend 309 but in the opposite direction will take place when a countersunk fastener is used by the hole H engaging the outer peripheral edge of flange 302 and the underside of the head of the fastener engaging the bend 309 adjacent same.

Figure 5:
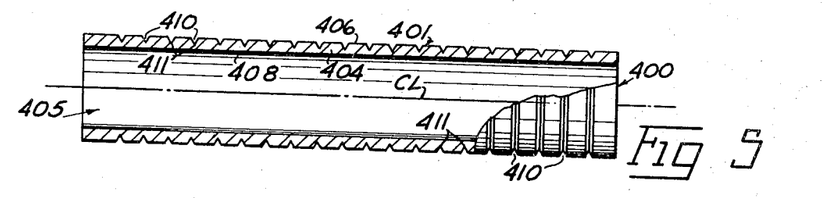
FIG. 5 is a longitudinal cross-sectional view of another embodiment of the invention without a head flange.

FIG. 5 illustrates another embodiment of the adapter 10 and is designated generally by the numeral 400. The adapter 400 is used where corrosion protection is not critical and includes only a sleeve 401 having a tubular side wall 404. Wall 404 defines passage 405 therethrough with inside and outside surface 408 and 406 respectively concentric about centerline CL.

Wall 404 is grooved circumferentially with V-shaped grooves 410 having sharp bottoms 411 as with adapter 100. The grooves 410 are used similarly to grooves 110 for sealant reservoirs and for adjusting the length of sleeve 401 to grip length of the fastener.

Adapter 400 is installed in a manner similar to that of adapter 100. That end of side wall 404 adjacent the head of the fastener may be beveled inwardly to conform to the underside of the head of a countersunk head fastener for use with this type of fastener.

Figure 6:
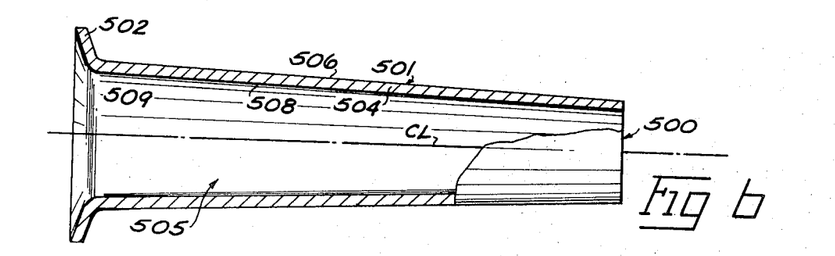
FIG. 6 is a longitudinal cross-sectional view of another embodiment of the invention for a tapered shank fastener.

Another embodiment of the adapter is shown in FIG. 6 and is designated generally by the numeral 500. The adapter 500 is used for enlarging the diameter of a tapered shanked fastener and includes a tapered shank sleeve 501 with a head flange 502 at one end thereof.

Sleeve 501 includes a tubular side wall 504 defining a constantly reducing passage 505 therethrough. Wall 504 has a constant thickness corresponding to that of side walls 104, 204, et. seq. and defines an outside surface 406 and inside surface 408 also of constantly reducing diameter. The taper of passage 505 conforms to that of a standard tapered shank fasteners and standard taperd holes through the work pieces.

The length of side wall 504 may be adjusted before installation to correspond to the grip length of the fastener with which it is to be used as is done with sleeve 201. Also, the side wall 504 may be circumferentially grooved as shown for walls 104, 304, and 404 to assist in adjusting the sleeve 501 to the proper grip length.

Annular flange 502 is of the same universal type as that illustrated for adapter 300, however, it is to be understood that a similar flange for exposed head fasteners only or countersunk head fasteners only may be used instead. Flange 502 is integral with one end of sleeve 501 through bend 509 and concentric with respect to the centerline CL of passage 505. The bent 509 is deformed as was explained for adapter 300 for both exposed head and countersunk head fasteners.

Figure 7:
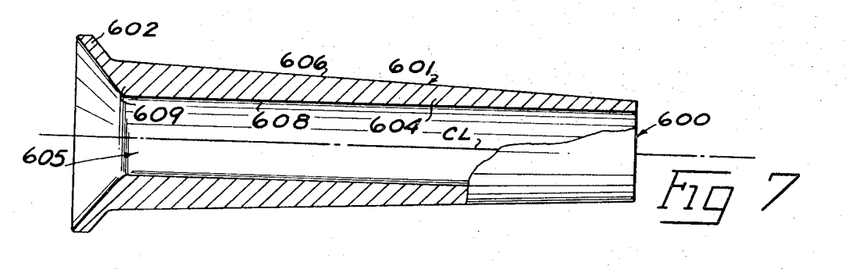
FIG. 7 is a longitudinal cross-sectional view of another embodiment of the invention for converting a fixed diameter fastener to a tapered application.
Figure 8:
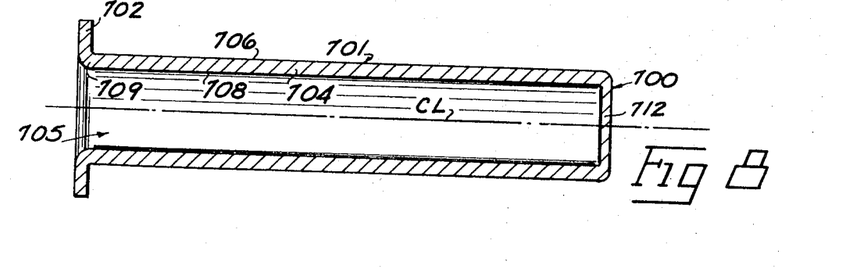
FIG. 8 is a longitudinal cross-sectional view of another embodiment of the invention having a closed end portion for use with a blind fastener.
Figure 11:
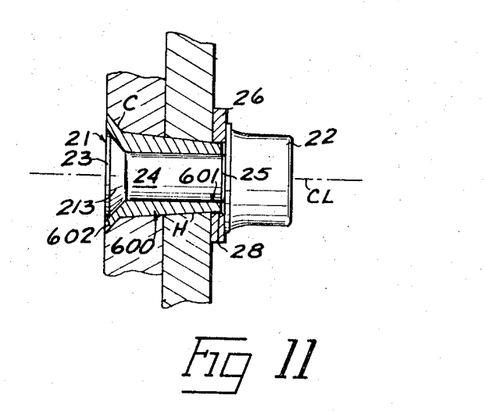
FIG. 11 is a longitudinal cross-sectional view of that embodiment of the invention shown in FIG. 7 as installed.

FIG. 7 illustrates still another embodiment of the adapter and is designated generally by the numeral 600. Adapter 600 is used to convert a standard constant diameter shanked fastener for use in tapered aligned holes H through the work pieces P as further illustrated in FIG. 11. The particular fastener shown in FIG. 11 is a standard lockbolt 21 having a constant diameter shank 24 and grooved end 25 which cooperates with swagable collar 22 to hold lockbolt 21 in position.

Although various thicknesses for the walls 104, 204, 304, 404, 504, and 704 may be used, it is desirable to have these thicknesses nominally 0.008 inch which gives an overall nominal increase in effective diameter to the fastener F of 1/64 inch or thicknesses nominally 0.016 inch which gives an overall nominal increase in effective diameter to the fastener F of 1/32 inch. It is also understood that the adapters may be coated with an anti-corrosive material to avoid corrosive chemical reactions between the various sleeve and the work pieces P.

Figure 12:
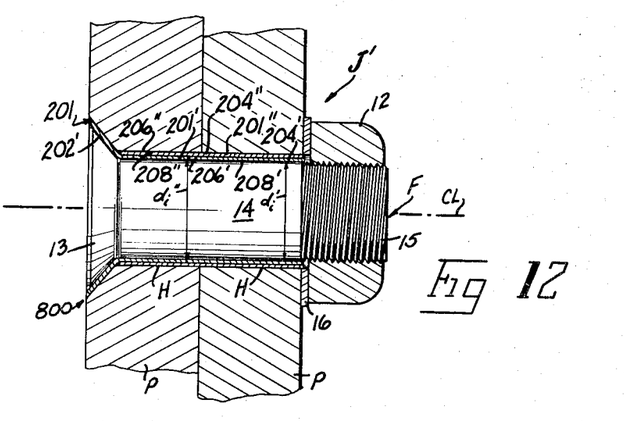
FIG. 12 is a longitudinal cross-sectional view of a double oversize embodiment of the invention.

Referring to FIG. 12, a double oversize adapter 800 is illustrated in a joint J' similar to the joint shown in FIG. 9. The adapter 800 uses a pair of sleeves 201 which precisely nest within each other to produce a combined enlargement of fastener diameter equal to twice the thickness of side wall 204 of each sleeve 201. The inside diameter $d_i'$ of the inside surface 208' of the inner sleeve 201' is substantially equal to the shank diameter of fastener F. The thickness of wall 204' of inner sleeve 201' is the same as that disclosed hereinabove for all of the adapters or nominally 0.008 inch. The inside diameter $d_i''$ of the inside surface 208'' of the outside sleeve 201'' is equal to the outside diameter of the outer surface 206' of inner sleeve 201'. The thickness of side wall 204'' of outer sleeve 201'' is also the same as that already disclosed. Thus, it will be seen that after the sleeves 201' and 201'' are cut to the proper length, the inner sleeve 201' can be placed around the shank 14 of fastener F and then the fastener F with sleeve 201' therearound forced into the sleeve 201'' to form the double oversize. Since the depth of the countersink for the head of fastener F should be kept to a minimum, the head flange of the outer sleeve 201' has been removed. The interface between surfaces 206' and 208'' provides an additional friction surface to avoid movement of the material of the sleeves 201' and 201'' axially within the holes H of work pieces P. Also, the holes H have a diameter substantially equal to that of the outside surface 206'' of the outer sleeve 201''.

Figure 14:
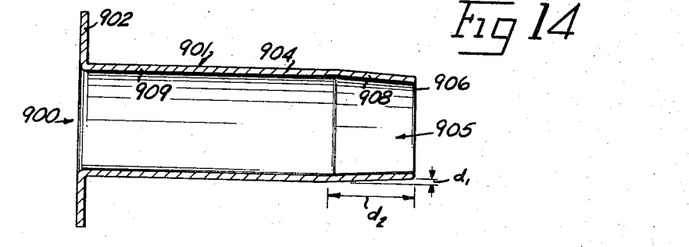
Figure 15:
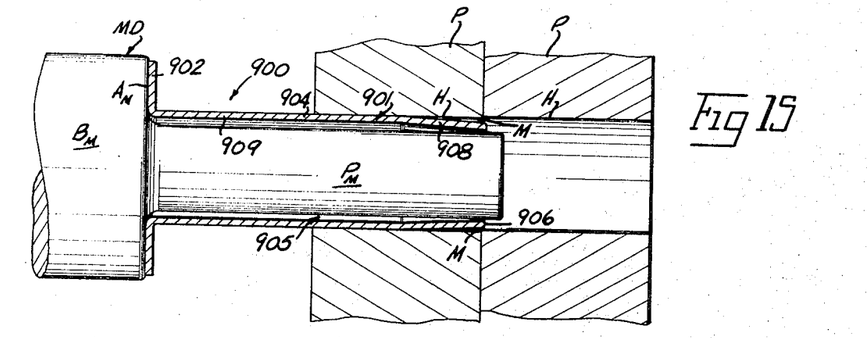
Figure 16:
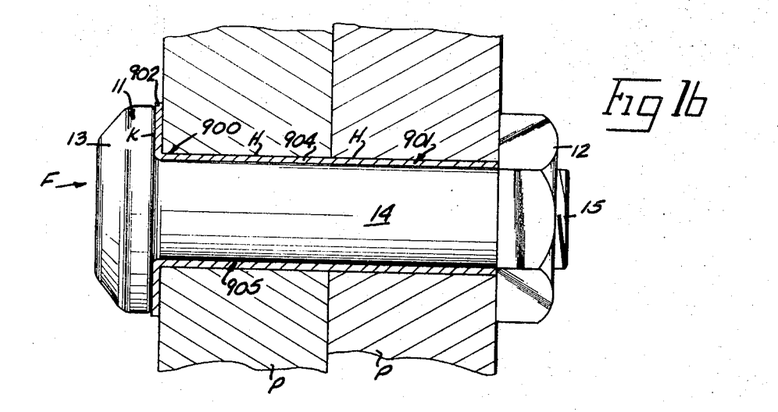

Referring to FIGS. 14–16, another embodiment of the adapter is shown and designated by the numeral 900. Adapter 900 includes a shank sleeve 901 and an annular head flange 902 at one end of sleeve 901. The sleeve 901 includes a tubular side wall 904 defining a fastener receiving central passage 905 therethrough and integral with head flange 902 at one end thereof. The free end 906 of the sleeve 901 tapers inwardly a prescribed amount $d_1$, usually 0.002–0.004 inch. The tapered portion 908 of side wall 904 extends down sleeve 901 a prescribed distance $d_2$, usually ⅛ inch. Thus, the side wall 904 has a constant diameter section 909 adjacent head flange 902 with the tapering diameter in portion 908. The thickness of side wall 904 is substantially constant along its length and is within the same thickness range as specified for adapters 100–700.

The tapered portion 908 serves to center the adapter 900 as it is inserted into holes H in the work pieces P as seen in FIG. 15 and to align any small amounts of misalignment M of work pieces P within holes H. A mandrel MD is provided for iserting the adapter 900 into the holes H as seen in FIG. 15. The mandrel MD includes a base $B_m$ with a cylindrical pilot $P_m$ projecting from one end of base $B_m$ so that an annular abuttment $A_m$ is provided on base $B_m$. The diameter of pilot $P_m$ is such that it will be just freely received through the tapered portion 908 and has a length such that the extending end of pilot $P_m$ extends at least just past the tapered portion 908 when the head flange 902 is resting on abuttment $A_m$. Thus, the abuttment $A_m$ actually forces adapter 900 into holes H until the head flange 902 of the adapter rests against the near side of the work pieces P while the pilot $P_m$ simply guides the sleeve 901 into the holes H. It will be noted that the side wall 904 is ungrooved and that the length of sleeve 901 has been preformed to a length substantially equal to the total thickness of work pieces P and the grip length of fastener F to be installed in holes H as seen in FIG. 16.

The sleeve 901 may be made of a metal as set forth hereinabove for the other adapters, however, when the adapter 900 is to be used in an interference fit with the work pieces P, the metal should be as strong as stainless steel in order that the sleeve 901 not collapse during the insertion of adapter 900 into holes H with mandrel md. As the adapter 900 is inserted in interference, the sleeve 901 is compressed slightly so that its inside and outside diameters are slightly reduced. This serves to cold work the inside of holes H to enhance the fatigue strength of the joint.

When the fastener F is inserted into the adapter 900 and forced toward the position shown in FIG. 16, the shank of the fastener expands both the sleeve and hole diameter. As the shank of the fastener passes through the tapered portion 908, it is expanded so that the sleeve 901 is now cylindrical for its entire length with a constant diameter. The nut 12 is then screwed in place on the fastener to complete the joint.

When one of the adapters is utilized in repair, the old fastener is removed from the aligned holes H in the work pieces P, and the aligned holes H enlarged by a specified amount, usually 1/64 inch on the diameter. The adapter is then placed around the appropriate fastener F and the assembly inserted through the enlarged holes H and tightened into place. When one of the adapters is used in original construction, the initial steps of removing the fastener F and enlarging the holes H set forth hereinabove can be eliminated.

When a person installing a large number of the same size fasteners F and damages only a few holes H in the work pieces P, only the damaged holes H need be made oversize. It is therefore desirable that all of the holes H be the same size to facilitate the installation of the fasteners F. This can be accomplished by installing the adapter in the damaged holes H without the fastener F therethrough and with a bonding agent between the sleeve thereof and the work pieces P. The grooves around the sleeves serve as reservoirs to retain a sufficient amount of the bonding agent therein to insure an adequate bond between the adapter and work pieces P without reducing the strength of the joint. The fasteners F can then be installed in conventional manner just as if all of the holes H were the same size.

The dimensions of sleeves 104, 204, 304, 404, 504, 604 and 704 are maintained within the required close tolerance with a range of 0.002 inch. This insures the precision fit necessary between the work pieces P, fasteners F and adapters 10.

From the foregoing, then, it will be seen that the method of the invention serves to precisely enlarge by a limited, fixed close tolerance amount, the effective shank diameter of a fastener to permit the structural joining of work pieces for highly loaded applications. This method comprises encircling that portion of the fastener in bearing contact with the work pieces with an enlarging member of predetermined close tolerance and limited thickness; and inserting the fastener with the enlarging member therearound through the aligned holes in the work pieces and tightening the fastener in conventional manner. If the material of the enlarging member is galvanically compatible with the work pieces, then there will be no corrosive reaction between the member and work pieces.

While specific embodiments of the invention have been disclosed herein, it is to be understood that numerous adaptations, modifications, and substitutions may be utilized without departing from the scope of the invention as set forth by the appended claims.

TABLE I

| Material (Commercial name) | Typical Ultimate Strength(3) (p.s.i.) | Typical Yield Strength(3) (p.s.i.) | Hardness (Brinell)(3) |
| --- | --- | --- | --- |
| 2017-T4 Aluminum Alloy | 62,000 | 40,000 | 105 |
| 6063-T5 Aluminum Alloy | 27,000 | 21,000 | 60 |
| 5052-H34(1) Aluminum Alloy | 38,000 | 31,000 | 68 |
| 5052-H32(2) Aluminum Alloy | 33,000 | 28,000 | 60 |
| 7075-T6 Aluminum Alloy | 83,000 | 73,000 | 150 |

NOTES:
(1) ½ hard
(2) ¼ hard
(3) Obtained from: MIL-HDBK-5 Materials Selector [1972 issue] Aluminum Association [1970–71 data]

TABLE II

| Material (Commercial Name) | Typical Ultimate Strength(2) (p.s.i.) | Typical Yield Strength(2) (p.s.i.) | Hardness (Rockwell)(2) |
| --- | --- | --- | --- |
| 302 Stainless Steel | 110,000 | 45,000 | B94 |
| A286 Stainless Steel(1) | 146,000 | 100,000 | B86 |

NOTES:
(1) Trademark of Allegheny Ludlum Steel Corp.
(2) Obtained from: MIL-HDBK-5 Materials Selector [1972 issue]

I claim:
1. A joint assembly including:
a plurality of work pieces having aligned holes therethrough of a first prescribed diameter;
a fastener through said holes having a shank portion defining a bearing area within said holes of a second prescribed diameter smaller than said first prescribed diameter; and,
a sleeve member within said holes between said shank portion of said fastener and said work pieces, said sleeve member including a continuous tubular side wall in bearing contact with both said shank portion of said fastener and said work pieces within said holes, said side wall substantially filling the space between said fastener and said work pieces within said holes and having a prescribed thickness less than the threshold thickness of the material of said sleeve member below which insignificant material flow within said side wall occurs under load to maintain the strength of said joint assembly.

2. The joint assembly of claim 1 wherein said prescribed thickness of said side wall is no greater than 0.008 inch along its length and wherein said side wall is made out of a material having a Brinell Hardness Number of at least 60 and a yield in excess of 20,000 p.s.i.

3. The joint assembly of claim 1 wherein said prescribed thickness of said side wall is nominally 0.008 inch along its length and wherein said side wall is made out of a material having a Brinell Hardness Number of at least 60 and a yield strength in excess of 20,000 p.s.i.

4. A joint assembly as set forth in claim 3 wherein said tubular wall defines a plurality of external circumferential weakened portions therein lying in a plane substantially perpendicular to the centerline of said tubular wall and spaced a prescribed distance apart along the length of said tubular wall.

5. A joint assembly as set forth in claim 4 wherein said weakened portions are inwardly extending generally V-shaped grooves, the innermost ends of said grooves having a substantially sharp pointed edge.

6. A joint assembly as set forth in claim 5 wherein said grooves have a depth equal to approximately one-half the thickness of said tubular wall.

7. The joint assembly of claim 5 further including a sealant filling said grooves.

8. The joint assembly of claim 3 wherein said fastener includes a head at one end of said shank portion and wherein said sleeve member further includes an annular head integral with one end of said tubular wall and lying between said head of said fastener and said work pieces.

9. The joint assembly of claim 8 wherein said fastener is of the blind expansion type and wherein said sleeve member further includes an end wall integral with and closing that end of said tubular wall opposite said annular head flange.

10. The joint assembly of claim 3 wherein said material is stainless steel.

11. A joint assembly as set forth in claim 8 wherein said tubular wall, prior to formation of said joint, includes a first section adjacent said head flange having a substantially constant diameter along its length, and a second section integral with said first section opposite said head flange tapering inwardly a prescribed amount for centering said sleeve member during insertion into said holes through said work pieces, said second section having been expanded by said shank portion of said fastener to the same constant diameter as said first section as said shank portion was inserted into said sleeve member.

12. A joint assembly as set forth in claim 11 wherein said material is stainless steel.

13. The joint assembly of claim 12 wherein said prescribed amount of taper for said second section is 0.002-0.004 inch.

14. A joint assembly including a plurality of work pieces with aligned holes therethrough of a prescribed diameter, a standard size fastener in said holes and having a shank portion a prescribed amount less in diamater than said holes, and a plurality of sleeve members positioned between said shank portion of said fastener and said work pieces within said aligned holes and nesting within each other, the innermost of said sleeve members in bearing contact with both said shank portion and the next outermost of said sleeve members, said outermost of said plurality of sleeve members in bearing contact with both said work pieces within said aligned holes and said next innermost of said sleeve members, each of said plurality of sleeve members including a tubular side wall, said tubular side walls nesting within each other to substantially fill the space between said work pieces and said fastener within said holes, each of said tubular side walls having a prescribed thickness less than the threshold thickness of the material of said sleeve member below which insignificant material flow within said side wall occurs under load to maintain the strength of said joint assembly.

15. The joint assembly of claim 14 wherein said prescribed thickness of each of said side walls is nominally 0.008 inch and wherein each of said side walls is made of a material having a Brinell Hardness Number of at least 60 and a yield strength in excess of 20,000 p.s.i.

16. The joint assembly of claim 14 wherein said fastener includes a head; wherein said innermost sleeve member further includes an annular head flange integral with one end of said side wall of said innermost sleeve member and underlying said head of said fastener; and wherein each of said sleeve members other than said innermost sleeve member do not have a head flange and said side wall of each of said other sleeve members terminates under said head flange of said innermost sleeve member.

17. The joint assemby of claim 16 wherein there are two sleeve members.

18. A joint assembly including:

a plurality of work pieces having aligned holes therethrough of a first prescribed diameter;

a fastener through said holes having a shank portion defining a bearing area within said holes of a second prescribed diameter smaller than said first prescribed diameter and having a head at one end of said shank portion; and, a stainless steel sleeve member within said holes between said shank portion of said fastener and said work pieces, said sleeve member including a continuous tubular side wall in bearing contact with both said shank portion of said fastener and said work pieces within said holes, and an annular head flange integral with one end of said side wall and underlying said head of said fastener, said side wall substantially filling the space between said fastener and said work pieces within said holes and having a nominal thickness of 0.008 inch along its length, said nominal thickness being less than the threshold thickness of the material of said sleeve member below which insignificant material flow within said side wall occurs under load to maintain the strength of said joint assembly.

19. A joint assembly as set forth in claim 1 wherein said tubular wall defines a plurality of external circumferential weakened portions therein lying in a plane substantially perpendicular to the centerline of said tubular wall and spaced a prescribed distance apart along the length of said tubular wall.

20. A joint assembly as set forth in claim 19 wherein said weakened portions are inwardly extending genrally V-shaped grooves, the innermost ends of said grooves having a substantially sharp pointed edge.

21. A joint assembly as set forth in claim 20 wherein said grooves have a depth equal to approximately one-half the thickness of said tubular wall.

22. The joint assembly of claim 1 wherein said fastener includes a head at one end of said shank portion and wherein said sleeve member further includes an annular head flange integral with one end of said tubular wall and lying between said head of said fastener and said work pieces.

23. The joint assembly of claim 22 wherein said material is stainless steel.

24. The joint assembly of claim 1 wherein said material is stainless steel.

* * * * *